April 6, 1971  F. E. ROM  3,574,057
GAS CORE NUCLEAR REACTOR
Filed May 27, 1968
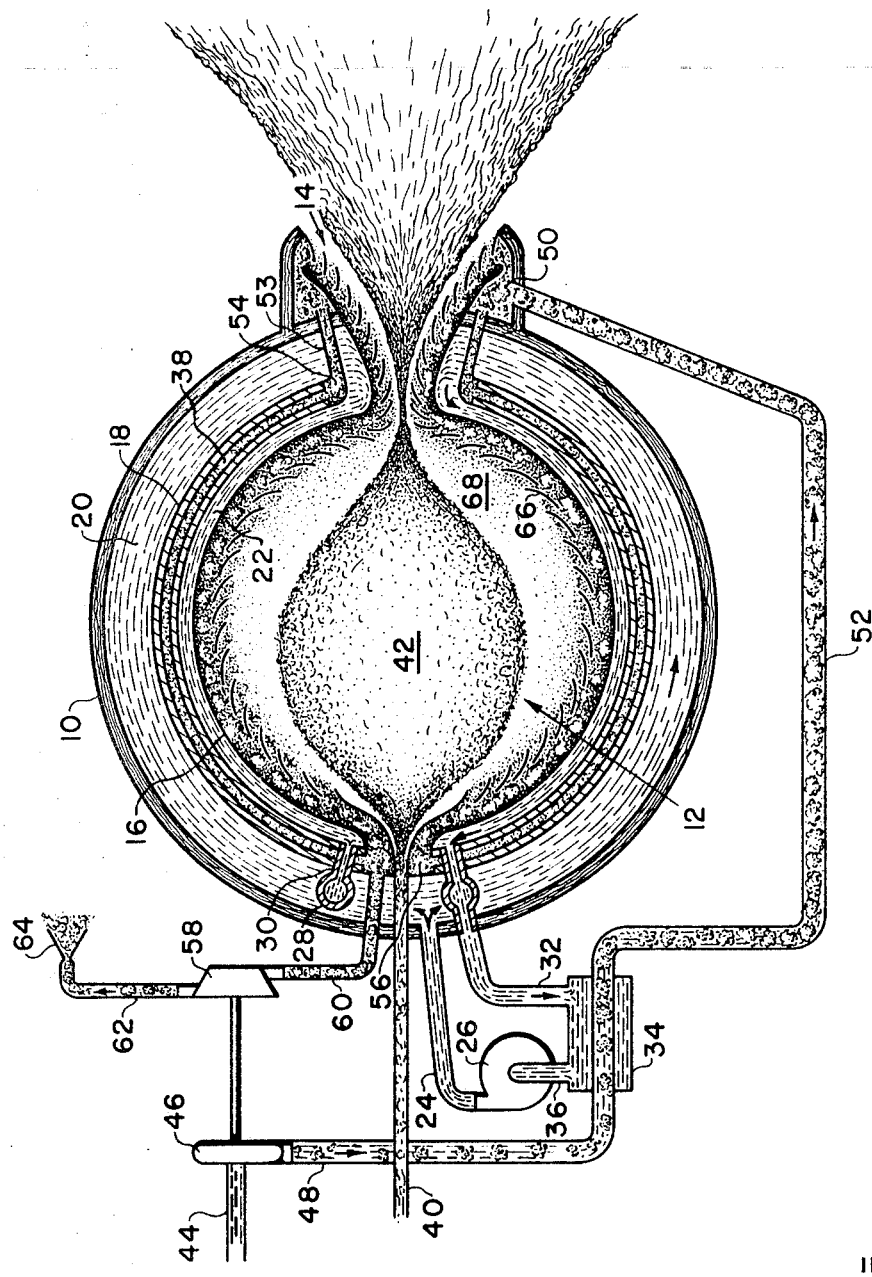
INVENTOR
FRANK E. ROM
BY
ATTORNEYS

United States Patent Office 3,574,057
Patented Apr. 6, 1971

3,574,057
GAS CORE NUCLEAR REACTOR
Frank E. Rom, Avon Lake, Ohio, assignor to the United States of America as represented by the Administrator of the National Aeronautics and Space Administration
Filed May 27, 1968, Ser. No. 732,455
Int. Cl. G21c 3/56, 19/28
U.S. Cl. 176—45       11 Claims

ABSTRACT OF THE DISCLOSURE

A gas passes through a pervious liner into a gaseous core nuclear reactor. This gas cools the liner and is then heated by a fissionable gas in the core. The heated gas is discharged from the reactor.

OWNERSHIP

The invention described herein was made by an employee of the United States Government and may be manufactured and used by or for the Government for governmental purposes without the payment of any royalties thereon or therefor.

INVENTION

The invention is concerned with an improved nuclear reactor of the gaseous core type. The invention is particularly directed to obtaining thermal energy from nuclear energy at temperature levels above the melting or boiling point of most materials.

BACKGROUND

A fissionable gas is utilized as a heat source in a nuclear rocket engine to achieve a specific impulse in the 1500 to 3000 second range with a vehicle thrust-to-weight between 0.1 and 10. Both coaxial flow and vortex gaseous nuclear reactors have been proposed for such applications. A high degree of mixing between the cooling gas and the fuel vapor is encountered in a coaxial flow reactor. Cooling difficulties, high operating pressures, and limitations in the volume of the fuel vapor region have also been encountered in such a reactor. Coolant flow in a gas vortex reactor may be limited and unstable. Very complex flow patterns are encountered which make the operation of the gas vortex reactor difficult.

SUMMARY

These problems have been solved in a gas core nuclear reactor constructed in accordance with the present invention. Uranium flows into a cavity where it is vaporized and forms a fissioning gas vapor. The energy generated by the fissioning process is thermally-radiated to hydrogen which flows around this uranium mass. The hydrogen is introduced through pervious walls with seed material entrained so as to render the hydrogen opaque to the thermal radiation emanating from the fissioning gas. The heated hydrogen passes through a nozzle to produce thrust.

Nuclear criticality is maintained by providing a sufficient amount of uranium gas within the cavity which is reflector-moderated by heavy water and beryllium oxide which is cooled by direct contact with flowing hydrogen before it flows through the cavity. The heavy water in the moderator system is circulated through a heat exchanger which is cooled by the incoming hydrogen.

OBJECT

It is, therefore, an object of the present invention to simplify the injection of fissionable material and coolant into a gas core nuclear reactor.

Another object of the invention is to provide a nuclear reactor with improved means for injecting fuel into the core while cooling the moderator.

A further object of the invention is to provide an improved gas core nuclear reactor having a geometry approximating a sphere or similar shape to minimize operating pressures and weights by minimizing the tendency for mixing between the flowing coolant stream and fissioning vapor.

These and other objects and advantages of the invention will be apparent from the specification which follows and from the drawing wherein like numerals are used throughout to identify like parts.

DRAWING

The drawing is an axial-section view of a gas core nuclear reactor constructed in accordance with the present invention.

DESCRIPTION

Referring now to the drawing, the reactor has a spherical shell 10 that encloses a cavity 12 for the reactor portion of the system. The shell 10 provides some shielding from the radiation produced by the fissioning gas within the cavity 12. The shell 10 is fabricated in one or several layers depending on the reactor operating pressure and the cooling requirements of the shell 10.

A nozzle 14 is provided to accelerate the reactor gases. Mixtures of coolant and entrained fissionable material are accelerated to high velocities to produce high jet velocities.

An impervious cavity liner 16 is positioned in the shell 10. The liner 16 is of a material that has a low neutron cross section, such as aluminum and zircalloy. The liner 16 also extends outwardly to the end of the nozzle 14 as shown in the drawing.

A solid moderator 18 is mounted between the liner 16 and the shell 10. This moderator 18 is preferably of beryllium oxide but could also be made of graphite or beryllium metal and acts as part of the neutron moderator for the reactor by absorbing most of the gamma and neutron energy emitted from the fissioned fuel. The thickness of the beryllium oxide moderator 18 is about 3 to 5 inches, depending on the degree of gamma and neutron absorption required for the particuar reactor.

The moderator 18 divides the space between the liner 16 and the shell 10 into an outer zone 20 and an inner zone 22. A supply pipe 24 from a circulating pump 26 is in communication with the outer zone 20. A liquid moderator, such as heavy water ($D_2O$), is pumped through the pipe 24 to the outer zone 20 where it flows to the opposite side of the shell 10 adjacent the nozzle 14. This liquid moderator then flows into the inner zone 22 and back to a toroidal header 28 through tubes 30 which provide a means for conducting the heavy water from the inner zone 22 through the moderator 18.

The header 28 provides a collection point for the liquid moderator coming from the inner zone 22. The heavy water is discharged from the header 28 to a pipe 32 which is in communication with a heat exchanger 34. The liquid moderator is then discharged from this heat exchanger to the circulating pump 26 through a line 36.

Heavy water in the outer zone 20 functions as a moderator to provide for the deceleration of neutrons for fissioning the vaporous fissionable material. This zone further prevents the excessive loss of neutrons from the system while providing a degree of shielding against neutrons and gamma rays emitted by the fissioning fuel. This heavy water also cools portions of the reactor that require cooling. The operating pressure of the heavy water is equal to that of the reactor pressure while the maximum operating temperature is on the order of 500° F.

The inner zone 22 which returns the heavy water to the header 28 functions as an efficient neutron moderator. It has a thickness from 2 to 6 inches, depending on the amount of heating from the fission neutron and gamma rays that can be tolerated in this zone. Increasing the thickness of the inner region 22 decreases the required thickness of the beryllium oxide moderator 18. This tends to reduce the amount of fissionable material required to operate the reactor.

The beryllium oxide 18 forms part of the neutron moderator for the reactor. The main function of the beryllium oxide is to absorb most of the gamma and neutron energy emitted from the fissioning fuel so that this energy is not deposited in the outer heavy water zone 20. The liquid moderator in this zone has a limited capacity for absorbing energy because it cannot operate at a high temperature. The beryllium oxide 18 operates at a temperature in the range of 2500° F. to 3500° F. This solid moderator is about 3 to 5 inches thick, depending on the gamma and neutron absorption requirements. Passages 38 are formed in the beryllium oxide moderator 18. A gaseous coolant passes through these passages which are properly sized and spaced to cool the beryllium oxide.

Uranium flows from a suitable source through a feed tube 40. Neutron poison materials, such as cadmium or boron compounds, clad the feed tube 40 in the region where the fuel passes through the zones of high neutron flux in the heavy water moderator. The fissionable material can be injected in several ways. For example, the fuel may be in the form of solid rods, balls, pellets, granules, dust, powder, or gas entrained particles.

Because of the low heat capacity of the fuel compared to the heat that is being generated within it due to fissioning, the fuel vaporizes almost instantly as it passes into the cavity 12. It expands very rapidly as it is converted into a gas and forms a central fuel vapor region 42. The fuel can be injected with a swirl or with straight axial flow where the fuel is in a particulate form entrained in a gas or vapor. The walls of the cavity 12 must be protected from thermal radiation from the fissioned gas. This is accomplished by providing the coolant with seeding between the cavity walls and the fissioning gas. The seed material can be injected into the coolant gas before or after the coolant gas enters the cavity region through the injection wall.

A coolant is supplied from a source through a line 44 to a pump 46. The primary coolant for the reactor is circulated at the required pressure level by the pump 46. Liquid hydrogen is used as a coolant in the reactor shown in the figure, and the pump 46 circulates this fluid at a high pressure.

The coolant discharged from the pump 46 is ducted through a suitable line 48 to the heat exchanger 34. The coolant is used to remove heat from the heavy water that is circulated by the pump 26. As the heavy water is circulated through the heat exchanger 34 it is cooled by the low temperature hydrogen.

The coolant passes from the heat exchanger 34 to a distribution plenum 50 in the nozzle 14 through a supply line 52. The plenum 50 distributes the reactor coolant between the nozzle cooling system and the beryllium oxide moderator cooling system as shown in the drawing. Feed tubes 53 lead to a distribution plenum 54 that is in communication with the passages 38. The coolant passes through the tubes 53 and plenum 54 to the passages 38 where it picks up gamma neutron energy which was deposited in the form of heat. The hydrogen entering the beryllium oxide moderator has a temperature of 500° F. The hydrogen leaves the beryllium oxide moderator adjacent the fuel feed tube 40 with a temperature in the order of 1000°–3000° F.

An outlet plenum 56 which surrounds the fuel feed tube 40 collects all coolant leaving the passages 38 in the beryllium oxide moderator 18. The plenum 56 further distributes the main reactor coolant to the cavity. A seed material is added to the coolant in the plenum 56 in a conventional manner.

Coolant passes from the plenum 56 to a turbine 58 through a line 60. The turbine 58 is operated by this cooling gas which is bled from the moderator outlet plenum and provides the power necessary to drive the coolant pump 46. The turbine inlet temperature can be regulated by diluting the moderator plenum outlet gas with pump discharge or moderator heat exchanger discharge gas. It is also contemplated that the pump 46 can be driven by other convenient power sources.

Coolant in an exhaust line 62 from the turbine 58 is released through a nozzle 64. The exhaust from the nozzle 64 provides some additional thrust for the rocket.

An important feature of the invention is the inner coolant injection wall 66 which encloses the cavity 12. This wall is pervious to the flow of coolant and is made from high strength, low neutron absorption cross section material. The pervious wall 66 introduces the reactor coolant into the cavity 12 in a controlled fashion. The wall 66 may be louvered or slotted, porous, or perforated. It may inject the reactor coolant with any desired velocity component in the axial, circumferential, or radial direction and in any combination of these three components as required by the particular application. The amount of flow as a function of location along the wall is controlled by the number or size of louvers, ports or openings, or the porosity of the wall. This wall is aluminum, zircalloy, molybdenum, columbium, or tungsten 184 to minimize its absorption of neutrons. As shown in the figure the wall 66 is also used to provide cooling in the nozzle region of the system.

In operation, a fuel such as U–233, U–235, or Pu–239 is injected into the cavity 12 in the manner previously described. The fissioning vaporous fuel in the region 42 reaches a temperature in the range of 20,000 to over 100,000° F. The fissioning atoms generate heat which is transferred from the region 42 by thermal radiation from the resultant high gas temperature. For optimum results, the largest possible fuel volume should be achieved to minimize the pressure produced by the high temperature ionized fuel vapor.

A coolant zone 68 is formed between the central fuel vapor region 42 and the pervious wall 66. The main flow of the coolant that is heated within the reactor flows through this coolant zone. The coolant is injected into this zone where it is heated by thermal radiation from the vaporous fissionable material in the central region 42.

Seed particles are entrained in the coolant to render it opaque to thermal radiation. The solid particulate seeds stop the thermal radiation from the vapor fuel region 42 and heat the coolant in which the particles are entrained. Some coolant gases absorb thermal radiation by themselves, especially at high temperatures. Seeding of such gases would not be required except in the low temperature regions near the inlet end of the reactor and along the walls. The seed material comprises fine particles of C, Mo, W, or any other suitable material.

The flow of coolant is generally from the inlet end of the reactor towards the nozzle 14, and all the coolant eventually leaves the reactor through the nozzle. The velocity distribution in all three possible directions can be optimized over the entire coolant flow region to maximize the fissionable fuel vapor region in volume. The injection wall 66 is protected from thermal radiation by the absorption of this radiation in the coolant.

While a preferred embodiment of the reactor has been shown and described, it will be apparent that various structural modifications can be made without departing from the spirit of the invention or the scope of the subjoined claims. By way of example, the beryllium oxide moderator could be eliminated if an external cooling system is provided for the heavy water moderator. This would be the case in a terrestrial application where air or water would be available for cooling. Also, the regenerative heat exchanger 34 would not be required for such a terrestrial application.

The nozzle 14 could be eliminated in applications where thrust is not required. In such applications it may be desirable to collect the effluent gases and remove certain constitutents, such as unfissioned fuel, fission products, or reactants that may have been introduced or generated within the cavity 12 in the case of a processing reactor. The collected fuel could be recycled through the injection system to conserve fuel for chemical processing reactors, terrestrial power reactor applications, or ultra-high temperature supply reactor applications.

What is claimed is:

1. In a gaseous core nuclear reactor of the type wherein a fissionable fuel heats a coolant, the improvement comprising
   a substantially spherical injection wall surrounding the gaseous core, said injection wall having an inwardly directed surface forming a cavity, all of said surface being exposed to said gaseous core, said wall being pervious to the flow of coolant to said surface,
   means for injecting a fissionable fuel into said cavity to form a region of fissioning gas in the center thereof,
   a substantially spherical impervious liner surrounding said pervious wall in spaced relationship thereto, and
   means for conducting said coolant from a source into the space between said liner and said inwardly directed surface of said injection wall for cooling said wall upon passing therethrough into said cavity and surrounding said fissioning gas thereby forming a coolant zone wherein said coolant is heated by thermal radiation, said injection wall being the only means for injecting said coolant into said cavity.

2. Apparatus as claimed in claim 1 wherein the fissionable fuel is a material selected from the group consisting of uranium-235, uranium-233, and plutonium-239.

3. Apparatus as claimed in claim 1 wherein the pervious wall is constructed from a material selected from the group consisting of aluminum, zircalloy, molybdenum, columbium, and tungsten-184 to minimize neutron absorption.

4. Apparatus as claimed in claim 1 wherein said coolant is introduced into the core through the pervious wall with a high velocity and pressure to maintain a space between said pervious wall and said region of fissioning gas whereby the temperature of said region is in the range of about 20,000° F. to 100,000° F.

5. Apparatus as claimed in claim 1 including
   an outer shell enclosing said impervious liner and said pervious wall, said shell being spaced outwardly from said impervious liner.

6. Apparatus as claimed in claim 5 including
   a moderator interposed between the outer shell and the impervious liner.

7. Apparatus as claimed in claim 6 wherein the moderator is beryllium oxide.

8. Apparatus as claimed in claim 7 wherein the beryllium oxide moderator has a plurality of passages formed therein, and
   means for conveying coolant from said coolant source to said passages for cooling said beryllium oxide moderator.

9. Apparatus as claimed in claim 6 including means for circulating heavy water about said moderator.

10. Apparatus as claimed in claim 9 including means for cooling the heavy water.

11. Apparatus as claimed in claim 1 wherein the gaseous coolant has seed particles entrained therein as it passes through the pervious wall thereby rendering said coolant opaque to thermal radiation, and
    a nozzle in communication with said cavity for accelerating said coolant as the same is heated by said fissioning gas in the center of said cavity.

References Cited

UNITED STATES PATENTS

| | | | |
|---|---|---|---|
| 2,994,651 | 8/1961 | Spence | 176—39X |
| 3,202,582 | 8/1965 | Rom | 176—52 |
| 3,270,496 | 9/1966 | Rom | 176—39X |
| 3,307,357 | 3/1967 | Colgate | 176—59X |
| 3,336,749 | 8/1967 | Rom et al. | 176—58X |
| 3,383,858 | 5/1968 | Willinski et al. | 176—39X |
| 3,399,534 | 9/1968 | Hunter et al. | 60—203 |

OTHER REFERENCES

Astronautics, October 1959, pp. 23–25.

BENJAMIN R. PADGETT, Primary Examiner

H. E. BEHREND, Assistant Examiner

U.S. Cl. X.R.

176—39, 52; 60—203

UNITED STATES PATENT OFFICE
CERTIFICATE OF CORRECTION

Patent No. 3,574,057                    Dated   April 6, 1971

Inventor(s)        Frank E. Rom

It is certified that error appears in the above-identified patent and that said Letters Patent are hereby corrected as shown below:

Column 5, lines 26 and 27, cancel "inwardly directed surface of said injection";

line 28, before "wall" insert --inwardly directed surface of said injection--.

Signed and sealed this 31st day of August 1971.

(SEAL)
Attest:

EDWARD M. FLETCHER, JR.                WILLIAM E. SCHUYLER, JR.
Attesting Officer                      Commissioner of Patents